( 12 ) United States Patent
Ando

(10) Patent No.: US 9,146,799 B2
(45) Date of Patent: Sep. 29, 2015

(54) STORAGE SYSTEM AND METHOD FOR CONTROLLING STORAGE SYSTEM

(71) Applicant: FUJITSU LIMITED, Kawasaki-shi, Kanagawa (JP)

(72) Inventor: Shun Ando, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 240 days.

(21) Appl. No.: 13/875,901

(22) Filed: May 2, 2013

(65) Prior Publication Data

US 2014/0006842 A1 Jan. 2, 2014

(30) Foreign Application Priority Data

Jun. 29, 2012 (JP) ................................. 2012-147888

(51) Int. Cl.
*G06F 11/00* (2006.01)
*G06F 11/07* (2006.01)
*G06F 3/06* (2006.01)

(52) U.S. Cl.
CPC ........ *G06F 11/0754* (2013.01); *G06F 11/0727* (2013.01); *G06F 11/0778* (2013.01); *G06F 3/0614* (2013.01); *G06F 3/0658* (2013.01)

(58) Field of Classification Search
USPC ................................................ 714/5.1, 5.11
See application file for complete search history.

(56) References Cited

U.S. PATENT DOCUMENTS

| 6,055,604 A | 4/2000 | Voigt et al. | |
| 6,792,559 B1* | 9/2004 | Cohen et al. | 714/15 |
| 2005/0283672 A1* | 12/2005 | Brown et al. | 714/31 |
| 2006/0075304 A1* | 4/2006 | Canning et al. | 714/38 |
| 2007/0074065 A1* | 3/2007 | Suzuki | 714/5 |
| 2008/0244331 A1* | 10/2008 | Grimes et al. | 714/48 |
| 2013/0275809 A1* | 10/2013 | Alexander et al. | 714/32 |

FOREIGN PATENT DOCUMENTS

| JP | 11-119919 | 4/1999 |
| JP | 2000-148544 | 5/2000 |
| JP | 2007-334668 | 12/2000 |

* cited by examiner

*Primary Examiner* — Sarai Butler
(74) *Attorney, Agent, or Firm* — Staas & Halsey LLP

(57) ABSTRACT

A storage system includes a plurality of control devices to control output and input of data to and from a storage device. At least one of the plurality of control devices includes an interface unit and an arithmetic processing unit. The interface unit receives an instruction regarding output or input of data to or from the storage device. The arithmetic processing unit receives the instruction from the interface unit and executes the instruction. The arithmetic processing unit selects, when an error has occurred in a specific interface unit, a first processing unit and requests the first processing unit to execute saving processing for saving dump data of the specific interface unit. The arithmetic processing unit selects, when a usage rate of the first processing unit goes beyond a threshold during execution of the saving processing, a second processing unit and requests the second processing unit to execute the saving processing.

10 Claims, 15 Drawing Sheets

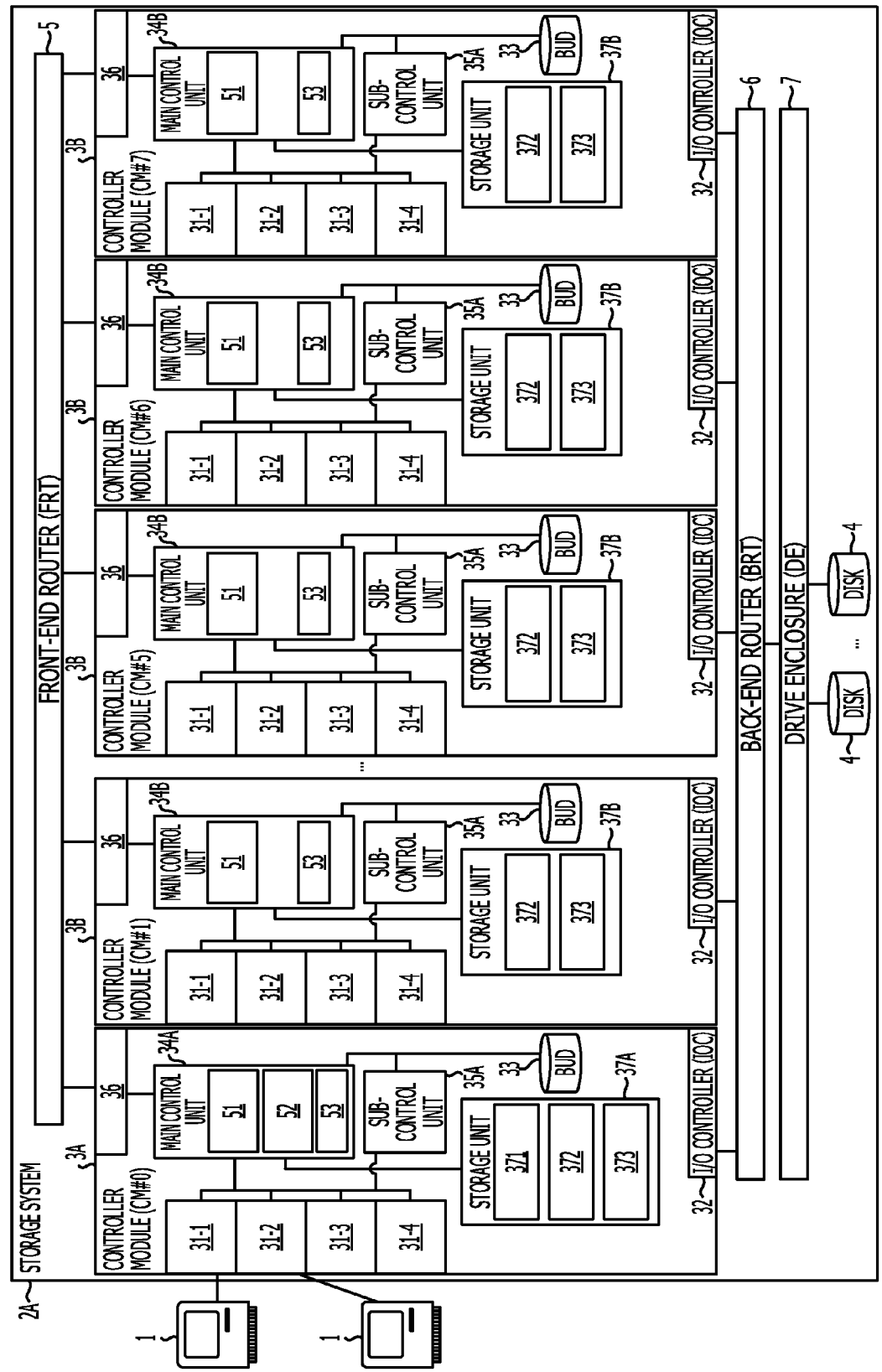

FIG. 3

| CPU | ACTIVE FLAG | SIPHONING TARGET CA | CA DUMP SIPHONING TIME (S) | CPU USAGE RATE | CA DUMP SIPHONING EXECUTION TIME (S) | I/O COMMAND NUMBER | I/O PROCESSING TIME (S) |
|---|---|---|---|---|---|---|---|
| CM#0 MAIN CPU | OFF | - | 50 | 0.8 | 250 | CROSS 100/ STRAIGHT 100 | 2 |
| CM#0 SUB CPU | OFF | - | 50 | 0.8 | 250 | CROSS 120/ STRAIGHT 100 | 2.2 |
| CM#1 MAIN CPU | OFF | - | 45 | 0.2 | 56.3 | CROSS 50/ STRAIGHT 50 | 1 |
| CM#1 SUB CPU | OFF | - | 45 | 0.3 | 64.3 | CROSS 50/ STRAIGHT 50 | 1 |
| CM#2 MAIN CPU | OFF | - | 50 | 0.4 | 83.3 | CROSS 80/ STRAIGHT 70 | 1.5 |
| CM#2 SUB CPU | OFF | - | 50 | 0.1 | 55.6 | CROSS 80/ STRAIGHT 90 | 1.7 |
| CM#3 MAIN CPU | OFF | - | 50 | 0.5 | 100 | CROSS 100/ STRAIGHT 100 | 2 |
| CM#3 SUB CPU | OFF | - | 50 | 0.5 | 100 | CROSS 100/ STRAIGHT 90 | 1.9 |
| CM#4 MAIN CPU | OFF | - | 50 | 0.5 | 100 | CROSS 110/ STRAIGHT 100 | 2.1 |
| CM#4 SUB CPU | OFF | - | 50 | 0.5 | 100 | CROSS 110/ STRAIGHT 110 | 2.2 |
| CM#5 MAIN CPU | OFF | - | 50 | 0.3 | 71.4 | CROSS 100/ STRAIGHT 100 | 2 |
| CM#5 SUB CPU | OFF | - | 50 | 0.2 | 62.5 | CROSS 100/ STRAIGHT 100 | 2 |
| CM#6 MAIN CPU | OFF | - | 50 | 0.5 | 100 | CROSS 40/ STRAIGHT 40 | 0.8 |
| CM#6 SUB CPU | OFF | - | 50 | 0.5 | 100 | CROSS 60/ STRAIGHT 50 | 1.1 |
| CM#7 MAIN CPU | OFF | - | 50 | 0.1 | 55.6 | CROSS 80/ STRAIGHT 80 | 1.6 |
| CM#7 SUB CPU | ON | CM#1-CA#0 | 50 | 0.1 | 55.6 | CROSS 40/ STRAIGHT 50 | 0.9 |

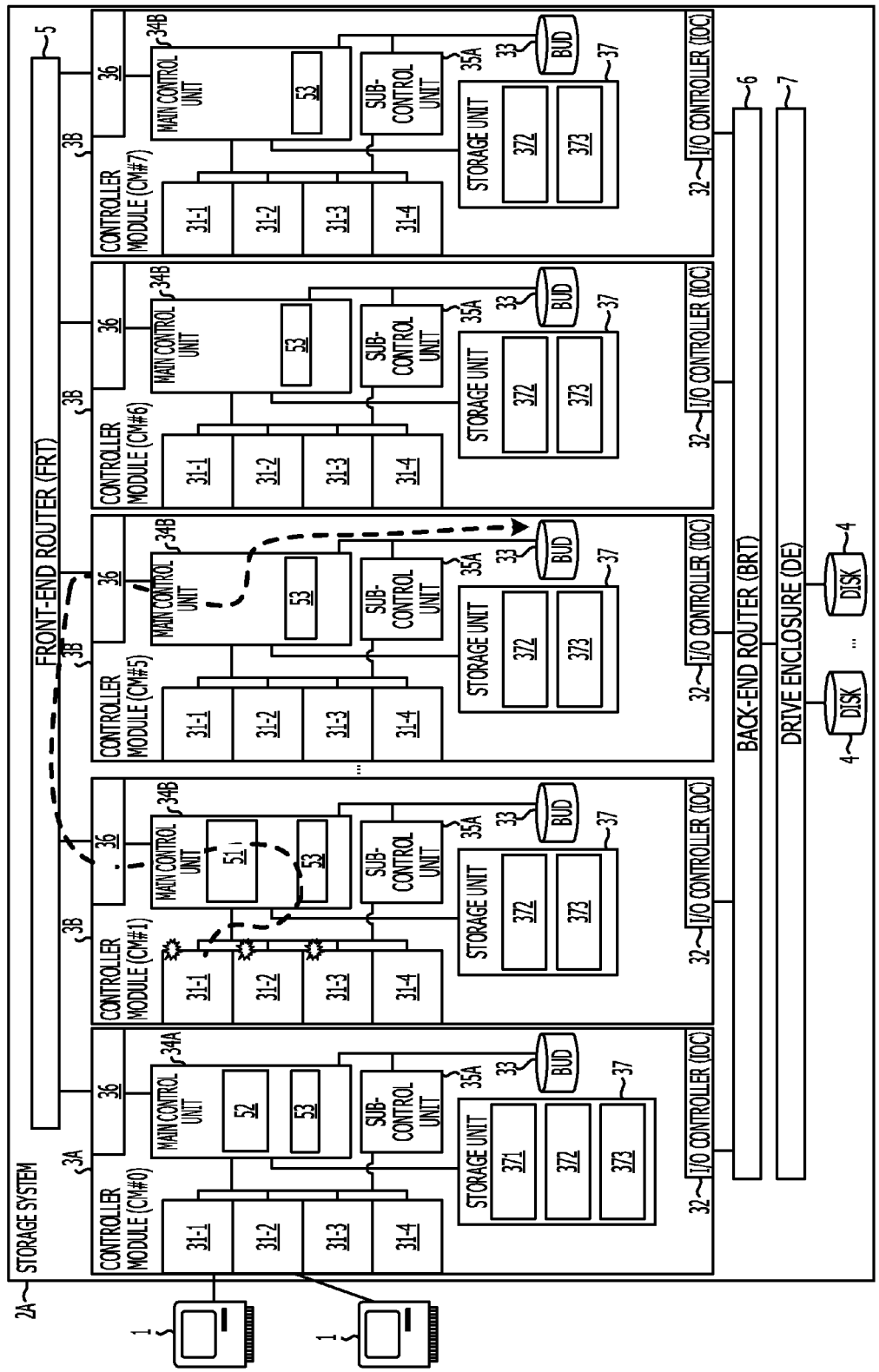

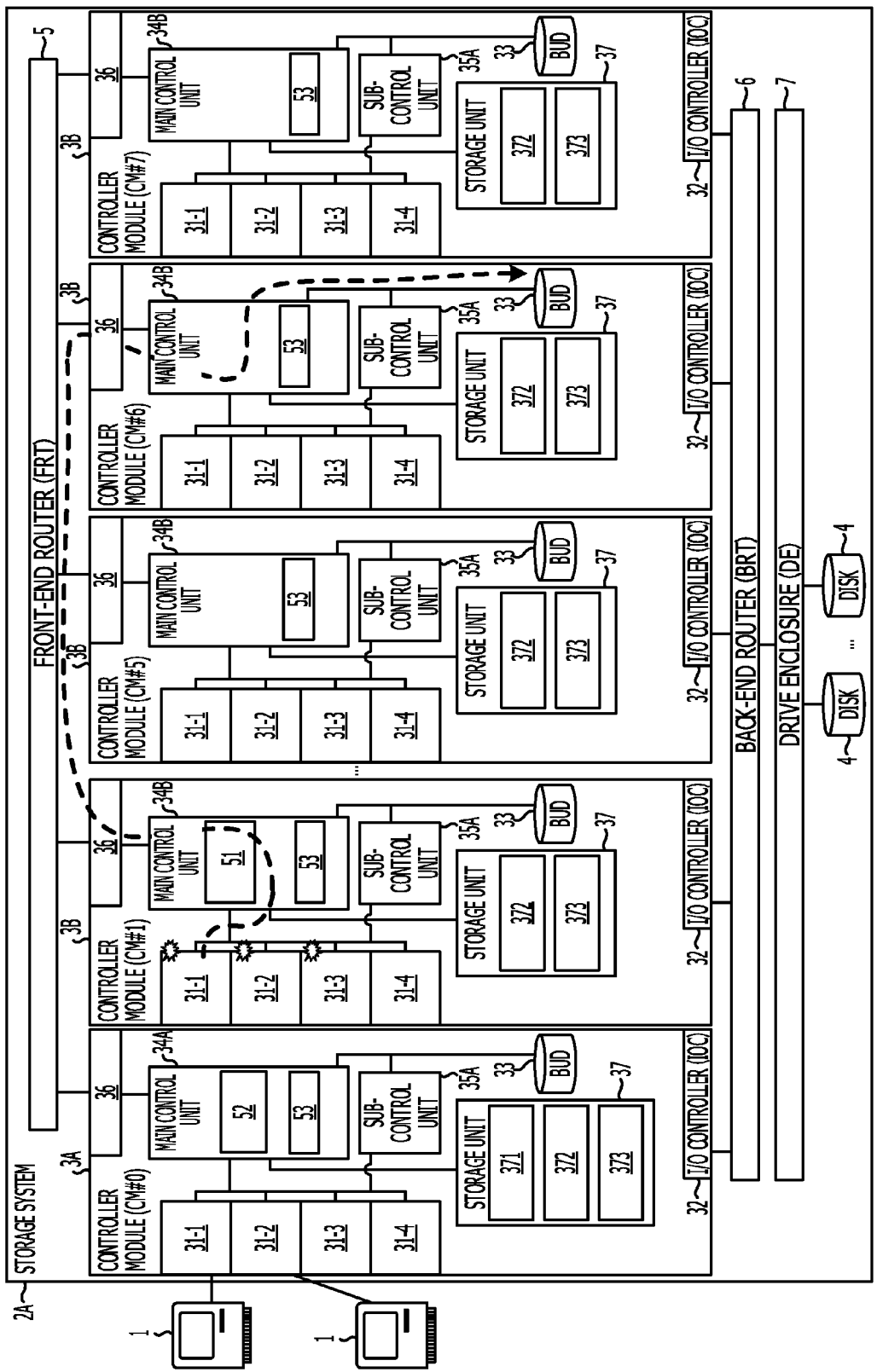

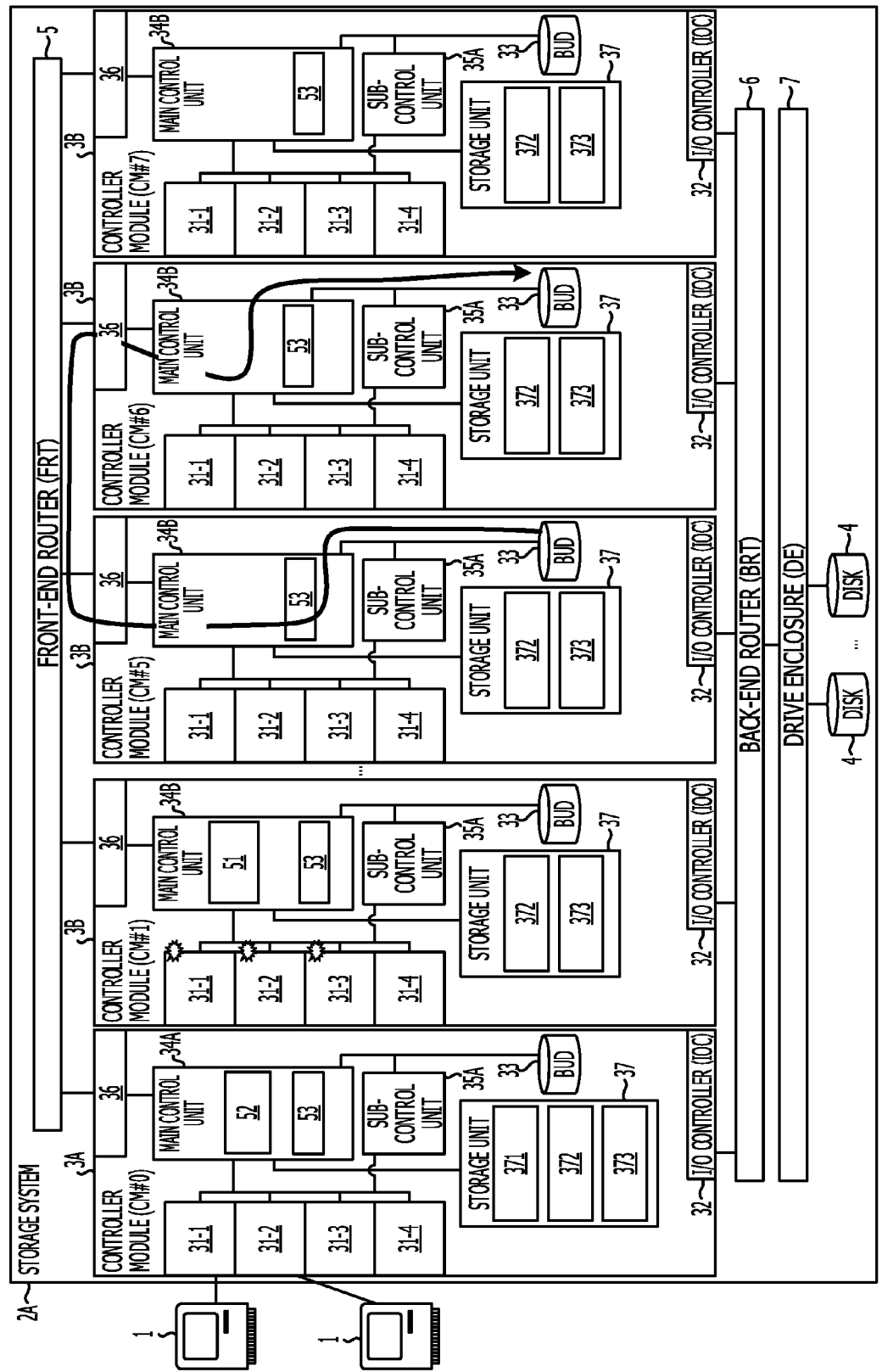

STORAGE SYSTEM AND METHOD FOR CONTROLLING STORAGE SYSTEM

CROSS-REFERENCE TO RELATED APPLICATION

This application is based upon and claims the benefit of priority of the prior Japanese Patent Application No. 2012-147888, filed on Jun. 29, 2012, the entire contents of which are incorporated herein by reference.

FIELD

The embodiments discussed herein are related to a storage system and a method for controlling a storage system.

BACKGROUND

In a storage system, a controller module (hereinafter, referred to as a CM) performs data control for a plurality of disk devices. For example, the CM receives an input/output (I/O) command to a disk device from a host computer via a channel adapter (hereinafter, referred to as a CA), which is an interface to the host computer. Then, the CM controls output and input of data to and from the disk device on the basis of the received I/O command.

Some CAs have a dump function of recording an internal file and the memory contents as dump data (fault information). When an error occurs in a CA having a dump function, a central processing unit (CPU) in a CM collects dump data from the CA in which the error has occurred and saves the collected dump data into a storage device called a bootup and utility device (BUD) in a system. The time from collection of dump data from the CA to completion of saving of the dump data into the BUD by the CPU is referred to as a "siphoning execution time". The processing for collecting dump data from the CA and then saving the collected dump data into the BUD is referred to as "siphoning processing".

For siphoning processing, a specified time is set. Accordingly, a storage system may estimate the "siphoning execution time" before siphoning processing starts and may determine whether or not the processing is terminated within the specified time. Here, in the case where the estimated "siphoning execution time" is within the specified time, the storage system determines that dump data collected from the CA may be recorded into the BUD with certainty.

After the dump data is collected and saved as described above, the CA in which the error has occurred is isolated from the CM. The dump data saved in the BUD includes fault information and is used for analysis of the error in the CA and recovery from the error.

Japanese Laid-open Patent Publication No. 2007-334668, Japanese Laid-open Patent Publication No. 2000-148544, and Japanese Laid-open Patent Publication No. 11-119919 disclose related techniques.

However, in the related arts described above, recording of dump data may not be ensured. For example, since the "siphoning execution time" changes in accordance with the usage rate of the CPU, the "siphoning execution time" increases as the usage rate of the CPU increases.

Thus, even in the case where the "siphoning execution time" estimated before siphoning processing is started is within the specified time, when the usage rate of a CPU increases while the CPU is performing the siphoning processing, the actual "siphoning execution time" may exceed the specified time. In this case, the CPU does not complete the processing for saving dump data collected from the CA into the BUD within the specified time. As a result, the storage system does not save part of the dump data collected from the CA into the BUD.

SUMMARY

According to an aspect of the present invention, provided is a storage system including a plurality of control devices to control output and input of data to and from a storage device. At least one of the plurality of control devices includes an interface unit and an arithmetic processing unit. The interface unit receives an instruction regarding output or input of data to or from the storage device. The arithmetic processing unit receives the instruction from the interface unit and executes the instruction. The arithmetic processing unit selects, when an error has occurred in a specific interface unit, a first processing unit and requests the first processing unit to execute saving processing for saving dump data of the specific interface unit. The specific interface unit is included in one of the plurality of control devices. The first processing unit is included in one of the plurality of control devices. The arithmetic processing unit selects, when a usage rate of the first processing unit goes beyond a threshold during execution of the saving processing, a second processing unit and requests the second processing unit to execute the saving processing. The second processing unit is included in one of the plurality of control devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a functional block diagram illustrating a configuration of a storage system according to a second embodiment;

FIG. 3 illustrates an example of a data structure of a siphoning control table used in a second embodiment;

FIG. 4A illustrates an example of a processing operation of saving processing for dump data;

FIG. 4B illustrates an example of a processing operation of saving processing for dump data;

FIG. 4D illustrates an example of a processing operation of saving processing for dump data;

DESCRIPTION OF EMBODIMENTS

Hereinafter, a storage system and a method for controlling a storage system according to embodiments will be described in detail with reference to the drawings. Embodiments are not limited by the described embodiments. The individual embodiments may be combined in an appropriate manner as long as no contradiction arises in the processing details.

First Embodiment

Configuration of Storage System According to First Embodiment

Figure 1:
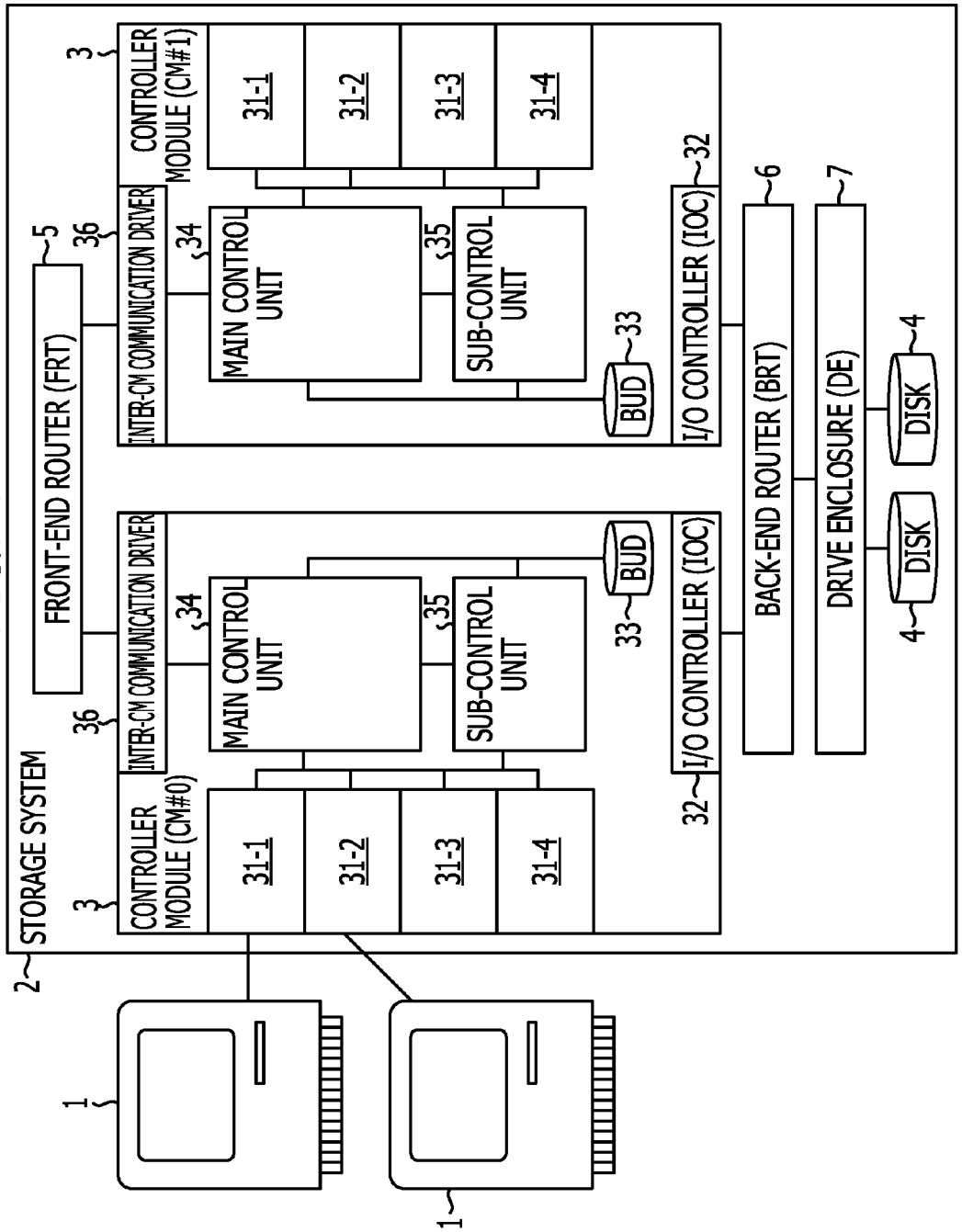
FIG. 1 is a functional block diagram illustrating a configuration of a storage system according to a first embodiment.

FIG. 1 is a functional block diagram illustrating a configuration of a storage system 2 according to a first embodiment. As illustrated in FIG. 1, the storage system 2 according to the first embodiment includes a controller module (hereinafter, referred to as a CM) 3, which is a control device, disks 4, a front-end router (hereinafter, referred to as an FRT) 5. The storage system 2 according to the first embodiment also includes a back-end router (hereinafter, referred to as a BRT) 6 and a drive enclosure (hereinafter, referred to as a DE) 7. The number of CMs 3 provided in the storage system 2 is not limited to the example illustrated in FIG. 1 and two or more CMs 3 are provided in the storage system. Furthermore, the number of disks 4 provided in the storage system 2 is not limited to the example illustrated in FIG. 1.

The storage system 2 according to the first embodiment is connected to host computers 1 that are information processing apparatuses serving as host devices. The storage system 2 receives an I/O command to a disk 4 from a host computer 1, and controls the received I/O command. The number of the host computers 1 connected to the storage system 2 is not limited to the example illustrated in FIG. 1.

The CM 3 is a device that controls output and input of data to and from the disk 4. In the example illustrated in FIG. 1, the number of CMs 3 is two. In the case where the CMs 3 are distinguished from one another, each CM 3 is described as a CM#0 or a CM#1, appropriately, as illustrated in FIG. 1.

The disk 4 is a storage device that stores data. The disk 4 may be, for example, a hard disk drive (HDD), a solid state drive (SSD), or the like. The FRT 5 allows connection between the CMs 3. The FRT 5 includes four paths used for communication between the CMs 3. The BRT 6 allows connection between one of the CMs 3 and one of the disks 4. The DE 7 is a casing to which the disks 4 are loaded.

Functional Configuration of CM

The CM 3 includes a plurality of channel adapters (hereinafter, referred to as CAs) 31, which is an interface unit for connecting to the host computers 1, and an I/O controller (hereinafter, referred to as an IOC) 32. The CM 3 also includes a BUD 33, a main control unit 34, a sub-control unit 35, and an inter-CM communication driver 36. In the case where the main control unit 34 and the sub-control unit 35 are not distinguished from each other, the main control unit 34 and the sub-control unit 35 are referred to as control units. A control unit is an arithmetic processing unit. A single path is used for communication between a CA and a CM in which the CA exists. The number of control units provided in the CM 3 is not limited to the example illustrated in FIG. 1. For example, the CM 3 may include a single control unit.

A CA 31 is a communication interface for communicably connecting to the host computer 1. For example, the CA 31 receives an I/O command, which is a command regarding input and output of data stored in the disk 4, from the host computer 1. A plurality of CAs 31 exist in the CM 3. In the example illustrated in FIG. 1, four CAs 31 exist. In the case where the CAs 31 are distinguished from one another, the CAs 31 are referred to as a CA 31-1 (CA#1), a CA 31-2 (CA#2), a CA 31-3 (CA#3), and a CA 31-4 (CA#4).

The CA 31 has a dump function of recording an internal file and memory contents as dump data. In the case where an error has occurred in a CA 31, dump data stored in the CA 31 is collected by the main control unit 34 and is saved into the BUD 33 in the storage system 2. In the description provided below, dump data stored in the CA 31 is referred to as "CA dump". Processing of separating a CM 3, a CA 31 in a CM 3, or another unit in a CM 3 is referred to as "degradation processing", which is performed when an error occurs in the CM 3, the CA 31, or the other unit.

The IOC 32 is a communication interface for communicably connecting to the disks 4. The BUD 33 is a storage device which stores, in the case where an error has occurred in a CA 31, dump data collected from the CA 31 by the main control unit 34. The dump data saved in the BUD 33 is used later for analyzing the error in the CA 31.

The main control unit 34 is connected to the CAs 31 and is a main control unit for the case where processing in the CM 3 is performed in a distributed manner. Hereinafter, description will be provided on the assumption that the main control unit 34 is a CPU. However, the main control unit 34 may be an electronic circuit such as a micro-processing unit (MPU). The main control unit 34 functions as various functional parts by, for example, executing controller module firmware (CFW) for controlling the CM 3.

In the case where an error has occurred in a CA 31 to which the main control unit 34 is connected, the main control unit 34 performs siphoning processing for dump data stored in the CA 31. For example, the main control unit 34 stores the dump data collected from the CA 31 in a storage unit (not illustrated), compresses the dump data in the storage unit, and saves the compressed dump data into the BUD 33. Processing for collecting dump data from the CA 31 and then saving the collected dump data into the BUD 33 is referred to as "siphoning processing".

In the case where the usage rate of a main control unit 34 goes beyond a specific threshold range during execution of saving processing, the main control unit 34 selects a main control unit 34 or a sub-control unit 35 provided in another CM 3, and requests the selected main control unit 34 or the selected sub-control unit 35 to perform saving processing for dump data.

For example, in the case where an error has occurred in a CA 31 of the CM#0, the main control unit 34 of the CM#0 saves dump data collected from the CA 31 into the BUD 33 of the CM#0. Furthermore, in the case where the usage rate of the main control unit 34 of the CM#0 goes beyond the specific threshold range during execution of the saving processing, the main control unit 34 of the CM#0 requests the main control unit 34 of the CM#1 to perform processing for saving the dump data collected from the CA 31 of the CM#0.

The sub-control unit 35 is connected to the CAs 31 and is a sub-control unit for the case where processing in the CM 3 is performed in a distributed manner. Hereinafter, description will be provided on the assumption that the sub-control unit 35 is a CPU. However, the sub-control unit 35 may be an electronic circuit such as an MPU. For example, the sub-control unit 35 functions as various functional parts by executing CFW for controlling the CM 3.

The inter-CM communication driver 36 is a communication interface for communicably connecting to other CM 3 via the FRT 5.

As described above, in the storage system 2 according to the first embodiment, in the case where the usage rate of a CM 3 goes beyond a specific threshold range during execution of saving processing for dump data collected from a CA 31 provided in the CM 3, the CM 3 requests another control unit to perform processing for saving the dump data. Thus, even in the case where the usage rate of the CM 3 goes beyond the specific threshold range during execution of the saving processing, the dump data collected from the CA 31 is recorded with certainty.

Second Embodiment

In the first embodiment, the case where a main control unit 34 connected to a CA 31 in which an error has occurred performs processing for siphoning dump data and requests another control unit to perform processing for siphoning dump data. In a main control unit 34 connected to a CA in which an error has occurred, at the time when siphoning processing for dump data starts, the CPU usage rate or the I/O load may be high. In this case, the main control unit 34 may not be able to save all the collected data into the BUD 33. Thus, in the case where an error has occurred in a CA, a control unit that has a low CPU usage rate and a low I/O load may be selected from the storage system, and the selected control unit may be caused to perform saving processing.

In a second embodiment, an example in which a master CM set in the storage system selects, in the case where an error has occurred in a CA, a control unit having a low CPU usage rate or a low I/O load and causes the selected control unit to perform saving processing will be described.

Configuration of Storage System According to Second Embodiment

FIG. 2 is a functional block diagram illustrating a configuration of a storage system 2A according to the second embodiment. As illustrated in FIG. 2, the storage system 2A includes a CM 3A, CMs 3B, disks 4, and an FRT 5, a BRT 6, and a DE 7. The storage system 2A is connected to host computers 1 serving as host devices. In the storage system 2A according to the second embodiment, units having functions similar to those in the configuration of the storage system 2 illustrated in FIG. 1 are referred to with the same reference numerals and the detailed description thereof will be omitted. In the example illustrated in FIG. 2, regarding the number of CMs provided in the storage system 2A, eight CMs in total, that is, one CM 3A and seven CMs 3B, are provided in the storage system 2A. However, the number of CMs provided in the storage system 2A is not limited to the example illustrated in FIG. 2 as long as three or more CMs are provided in the storage system 2A. In FIG. 2, only four of the seven CMs 3B are illustrated. The number of disks 4 provided in the storage system 2A is not limited to the example illustrated in FIG. 2.

Here, for example, the CM 3A is defined as a master CM and the CMs 3B are defined as slave CMs. The master CM has a function of selecting, within the storage system 2A, a main control unit or a sub-control unit to which execution of saving processing is requested in the case where an error has occurred in a CA. For the convenience of description, the CM 3A is described as a CM#0 when appropriate. Furthermore, in the case where the CMs 3B are distinguished from one another, the CMs 3B are described as a CM#1, a CM#5, a CM#6, and a CM#7, as illustrated in FIG. 2.

Functional Configuration of Master CM

The CM 3A is a device that controls output and input of data to and from the disks 4. The CM 3A includes a plurality of CAs 31, an IOC 32, a BUD 33, a main control unit 34A, a sub-control unit 35A, an inter-CM communication driver 36, and a storage unit 37A. In the CM 3A in the second embodiment, units having functions similar to those in the configuration of the CM 3 illustrated in FIG. 1 are referred to with the same reference numerals and the detailed description thereof will be omitted. The number of control units provided in the CM 3A is not limited to the example illustrated in FIG. 2. For example, the CM 3A may include a single control unit.

The main control unit 34A is a main control unit for the case where processing in the CM 3A is performed in a distributed manner. The main control unit 34A includes a siphoning processing part 51, a siphoning destination designating part 52, and an information acquiring part 53. Hereinafter, description is provided on the assumption that the main control unit 34A is a CPU. However, the main control unit 34A may be an electronic circuit such as an MPU. The main control unit 34A functions as various functional parts by, for example, executing CFW for controlling the CM 3A.

Upon detecting an error in a CA 31 connected to a control unit, the siphoning processing part 51 included in the control unit causes the siphoning destination designating part 52 of the master CM 3A to designate a siphoning destination for dump data of the CA 31 in which the error is detected. For example, the siphoning processing part 51 transmits, via the inter-CM communication driver 36, a request for acquiring a siphoning destination to the siphoning destination designating part 52 of the master CM 3A. At this time, the siphoning processing part 51 transfers the size of the dump data to the siphoning destination designating part 52 of the master CM 3A.

Then, the siphoning processing part 51 requests the siphoning destination, which is designated by the siphoning destination designating part 52 of the master CM 3A, to save the dump data of the CA 31 in which the error is detected.

The siphoning processing part 51 performs, when requested from another siphoning processing part 51 to save dump data, saving processing for dump data for the CA 31 in which an error has occurred. For example, the siphoning processing part 51 acquires dump data of the CA 31 in which an error has occurred, and saves the acquired dump data into the storage unit 37A with which the siphoning processing part 51 is connected. Then, the siphoning processing part 51 compresses the dump data stored in the storage unit 37A, and saves the compressed dump data into the BUD 33.

Furthermore, in the case where the usage rate of the selected control unit goes beyond a specific threshold range during execution of saving processing, the siphoning processing part 51 performs the processing described below. That is, the siphoning processing part 51 causes a newly selected control unit to save dump data that has been saved by the control unit whose usage rate goes beyond the specific threshold range and that has not been saved by the newly selected control unit. Processing for saving dump data that has been saved by the control unit whose usage rate goes beyond the specific threshold range and that has not been saved by the newly selected control unit is referred to as "copying processing".

When a request for designating a siphoning destination is issued from the siphoning processing part 51 of the main control unit 34A, the main control unit 34B, or the sub-control unit 35A, the siphoning destination designating part 52 performs the processing described below. That is, the siphoning destination designating part 52 monitors the usage rates of control units provided in a plurality of CMs, and selects a control unit whose dump data saving processing time, which is calculated on the basis of the usage rate, is shorter than a specific time and whose I/O processing time, which is calculated on the basis of the number of I/O commands, is the shortest.

For example, the siphoning destination designating part 52 narrows candidates for a siphoning destination down to control units whose dump data siphoning time for a CA 31 in which an error is detected is shorter than a specified time. Furthermore, the siphoning destination designating part 52 designates a control unit having the shortest processing time, which is converted from the number of I/O commands being processed, for a siphoning destination from among the narrowed down candidates.

Processing performed by the siphoning destination designating part 52 for estimating whether or not processing for siphoning dump data will be completed within a specified time with certainty will be described. For example, the siphoning destination designating part 52 calculates an estimated time for dump data siphoning processing as a "CA dump siphoning time" for each control unit on the basis of the size of CA dump data, and stores the calculated estimated time into a siphoning control table 371. The siphoning destination designating part 52 calculates the "CA dump siphoning time" on the basis of Equation (1). Equation (1) is as follows:

CA dump siphoning time={(CM/CA communication time)+(CM/CM communication time)+(data compression time)+(BUD saving time)}×(data size)  (1)

Here, the data size represents a data size of dump data of a CA in which an error has occurred. The CM/CA communication time represents communication time for the case where data of 1 megabyte (MB) is communicated between a CA in which an error has occurred and a CM including the CA. The CM/CM communication time represents communication time for the case where data of 1 MB is transferred from a CM including a CA in which an error has occurred to a CM of a siphoning destination, and is used for the case where the siphoning destination is located outside the CM including the CA in which the error has occurred. The data compression time represents the time for compressing data of 1 MB. The BUD saving time represents the time for saving compressed data of 1 MB.

Processing performed by the siphoning destination designating part 52 for estimating whether or not processing for siphoning dump data will be completed within a specified time with certainty will be described. For example, the siphoning destination designating part 52 calculates an estimated time for dump data siphoning processing as a "CA dump siphoning time" for each control unit on the basis of the size of CA dump data, and stores the calculated estimated time into a siphoning control table 371. The siphoning destination designating part 52 calculates the "CA dump siphoning time" using Equation (2). Equation (2) is as follows:

CA dump siphoning execution time=(CA dump siphoning time)/{1−(usage rate of control unit)}  (2)

Then, the siphoning destination designating part 52 stores the calculated "CA dump siphoning execution time" for each control unit into the siphoning control table 371. The siphoning destination designating part 52 compares the "CA dump siphoning execution time" for each control unit stored in the siphoning control table 371 with a specified time allowed for siphoning, and narrows candidates for a siphoning destination down to control units that are capable of completing siphoning within the specified time. Here, the siphoning destination designating part 52 selects, as candidates for a siphoning destination, control units for which "active flag" is not "ON".

Next, processing performed by the siphoning destination designating part 52 for designating a control unit whose input/output processing time is the shortest among candidates for a siphoning destination will now be described. For example, the siphoning destination designating part 52 acquires the number of I/O commands being processed by each control unit on the basis of command number information 373 for each CM. Then, the siphoning destination designating part 52 calculates the "I/O processing time" for each control unit, which is the processing time for each control unit converted from the acquired number of I/O commands. The siphoning destination designating part 52 calculates the "I/O processing time" of each control unit, using Equation (3), on the basis of the number of I/O commands for straight access not using inter-CM communication and the number of I/O commands for cross access using inter-CM communication. Equation (3) is as follows:

I/O processing time=(the number of I/O commands for cross access)×(I/O command processing time for cross access)+(the number of I/O commands for straight access)×(I/O command processing time for straight access)  (3)

The number of I/O commands for cross access represents the number of I/O commands being processed for cross access. The number of I/O commands for cross access includes the number of I/O commands received by inter-CM communication as well as the number of I/O commands transmitted by inter-CM communication. The I/O command processing time for cross access represents the processing time for the case of processing of one I/O command for cross access. The number of I/O commands for straight access represents the number of I/O commands being processed for straight access. The I/O command processing time for straight access represents the processing time for the case of processing of one I/O command for straight access.

Then, the siphoning destination designating part 52 stores the calculated I/O processing time for each control unit into the siphoning control table 371. Then, the siphoning destination designating part 52 designates two siphoning destinations, from among the narrowed down candidates for a siphoning destination, in order from the control unit whose I/O processing time for the control unit stored in the siphoning control table 371 is the shortest. The siphoning destination designating part 52 notifies the requesting CM of the designated siphoning destination. Accordingly, the requesting CM is capable of requesting the designated siphoning destination to collect and save dump data of a CA 31 in which an error is detected.

There may be no control unit whose siphoning time for dump data of a CA 31 in which an error is detected is shorter than a specified time allowed for siphoning dump data. In such a case, the siphoning destination designating part 52 may designate a control unit whose CA dump siphoning execution time is the shortest as a siphoning destination. Accordingly, the siphoning destination designating part 52 is capable of causing the designated siphoning destination to collect and save the dump data for the specified time and to perform an examination regarding error using the collected and saved dump data.

The siphoning destination designating part 52 monitors the usage rates of control units provided in a plurality of CMs. When the dump data saving processing time calculated on the basis of the usage rate is longer than a specific time, the siphoning destination designating part 52 performs the processing described below. That is, the siphoning destination designating part 52 newly selects a control unit whose dump data saving processing time, which is calculated on the basis of the usage rate, is shorter than the specific time and whose I/O processing time, which is calculated on the basis of the number of I/O commands, is the shortest.

The information acquiring part 53 acquires a value of the usage rate of the control unit, and includes the acquired value into the CPU usage rate information 372 stored in the storage unit 37A, which will be described later. The information acquiring part 53 acquires a value of the number of I/O commands, and includes the acquired value into the command number information 373 stored in the storage unit 37A, which will be described later.

The sub-control unit 35A is a sub-control unit for the case where processing in the CM 3A is performed in a distributed manner. The sub-control unit 35A includes a siphoning processing part 51 and an information acquiring part 53. Hereinafter, description will be provided on the assumption that the sub-control unit 35A is a CPU. However, the sub-control unit 35A may be an electronic circuit such as an MPU. The sub-control unit 35A functions as various functional parts by, for example, executing CFW for controlling the CM 3A.

The storage unit 37A stores various data to be used for processing by the main control unit 34A or the sub-control unit 35A. For example, the storage unit 37A stores the siphoning control table 371, the CPU usage rate information 372, and the command number information 373.

The siphoning control table 371 stores, for each control unit, the estimated time for siphoning processing and the processing time converted from the number of input/output commands being processed in association with each control unit. The siphoning control table 371 is created by, for example, the siphoning destination designating part 52, and is used for designating a siphoning destination. The details of the siphoning control table 371 will be described later.

The CPU usage rate information 372 manages information including the usage rate of each control unit in the CM. The command number information 373 manages information including the number of input/output commands being processed by each control unit in the CM.

Functional Configuration of Slave CM

The CM 3B is a device that controls output and input of data to and from the disks 4. The CM 3B includes a plurality of CAs 31, an IOC 32, a BUD 33, a main control unit 34B, a sub-control unit 35A, an inter-CM communication driver 36, and a storage unit 37B. Units of the CM 3B in the second embodiment having functions similar to those in the configuration of the CM 3A illustrated in FIG. 2 are referred to with the same reference numerals and the detailed description thereof will be omitted. The number of control units provided in the CM 3B is not limited to the example illustrated in FIG. 2. For example, the CM 3B may include a single control unit.

The main control unit 34B is a main control unit for the case where processing in the CM 3B is performed in a distributed manner. The main control unit 34B includes siphoning processing part 51 and the information acquiring part 53. Hereinafter, description will be provided on the assumption that the main control unit 34B is a CPU. However, the main control unit 34B may be an electronic circuit such as an MPU. The main control unit 34B functions as various functional parts by, for example, executing CFW for controlling the CM 3B.

The storage unit 37B stores various data to be used for processing by the main control unit 34B or the sub-control unit 35A. For example, the storage unit 37B stores the CPU usage rate information 372 and the command number information 373.

Data Structure of Siphoning Control Table

A data structure of the siphoning control table 371 will be described with reference to FIG. 3. FIG. 3 illustrates an example of a data structure of the siphoning control table 371 used in the second embodiment. As illustrated in FIG. 3, the siphoning control table 371 stores an "active flag" item 371b, a "siphoning target CA" item 371c, a "CA dump siphoning time" item 371d, a "CPU usage rate" item 371e, and a "CA dump siphoning execution time" item 371f in association with a "CPU" item 371a. Furthermore, the siphoning control table 371 stores an "I/O command number" item 371g and an "I/O processing time" item 371h in association with the "CPU" item 371a.

The "CPU" item 371a represents a CPU corresponding to a control unit in the case where a CPU is used as the control unit. The "active flag" item 371b is a flag representing whether or not siphoning processing is being performed. For example, in the case where the siphoning processing is being performed, "ON" is set. In the case where the siphoning processing is not being performed, "OFF" is set. The "siphoning target CA" item 371c represents a siphoning target CA in the case where the siphoning processing is being performed. The "CA dump siphoning time" item 371d represents an estimated time for siphoning processing for dump data by the CPU, which is estimated on the basis of the size of the dump data of the CA. The "CPU usage rate" item 371e represents the usage rate of the CPU. The "CA dump siphoning execution time" item 371f represents an estimated time for performing siphoning processing corresponding to the usage rate of the CPU. The "I/O command number" item 371g represents the number of I/O commands being processed by the CPU. For example, the number of I/O commands for cross access and the number of I/O commands for straight access are individually set. The "I/O processing time" item 371h represents the processing time converted from the number of I/O commands for the CPU.

In the case where the "CPU" item 371a is a "main CPU of the CM#0", for example, "OFF" is stored as the "active flag" item 371b, "–" is stored as the "siphoning target CA" item 371c, and "50" seconds (s) is stored as the "CA dump siphoning time" item 371d. Furthermore, "0.8" is stored as the "CPU usage rate" item 371e, "250" seconds (s) is stored as the "CA dump siphoning execution time" item 371f, "cross 100/ straight 100" is stored as the "I/O command number" item 371g, and "2" seconds (s) is stored as the "I/O processing time" item 371h. Furthermore, in the case where the "CPU" item 371a is a "sub-CPU of the CM#7", "CM#1-CA#0" is stored as the "siphoning target CA" item 371c. That is, in the example illustrated in FIG. 3, the sub-CPU of the CM#7 is performing processing for siphoning dump data of the CA#0 in the CM#1.

Processing Operation of Storage System

The processing operation of a storage system will now be described with reference to FIGS. 4A to 4E and FIGS. 5A to 5C. The processing operation of saving processing for dump data will be described with reference to FIGS. 4A to 4E and the processing operation of copying processing will be described with reference to FIGS. 5A to 5C.

Saving Processing for Dump Data

Figure 4C:
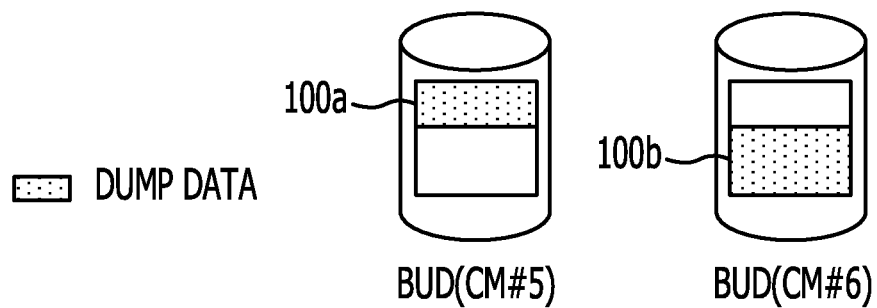
FIG. 4C illustrates an example of a processing operation of saving processing for dump data.

FIGS. 4A to 4E illustrate an example of the processing operation of saving processing for dump data. As illustrated in FIG. 4A, in the case where a degradation of the CA#1 has occurred in the CM#1, the siphoning destination designating part 52 in the CM#0, which is a master CM, selects a control unit of a siphoning destination. The case where the siphoning destination designating part 52 selects the main control unit 34B of the CM#5 is illustrated in the example of FIG. 4A.

In the main control unit 34B of the CM#1, the siphoning processing part 51 transfers dump data to the main control unit 34B of the CM#5. The main control unit 34B of the CM#5 performs compression of the dump data and saving of the dump data into the BUD 33 in a parallel manner. Here, in the case where the usage rate of the main control unit 34B of the CM#5 exceeds a specific threshold during execution of compression of the dump data and the saving of the dump data into the BUD 33, the siphoning destination designating part 52 in the CM#0 selects a control unit of a new saving destination. Here, an example in which the siphoning destination designating part 52 of the CM#0 switches the control unit of the saving destination from the main control unit 34B of the CM#5 to the main control unit 34B of the CM#6 will be described.

For example, as illustrated in FIG. 4B, in the case where the usage rate of the main control unit 34B of the CM#5 exceeds the specific threshold, the siphoning destination designating part 52 of the CM#0 newly selects the main control unit 34B of the CM#6. Then, the siphoning processing part 51 in the main control unit 34B of the CM#1 transfers dump data to the main control unit 34 of the CM#6. The main control unit 34B of the CM#6 performs compression of the dump data and saving of the dump data into the BUD 33 in a parallel manner.

Dump data that is saved into the BUD 33 of the CM#5 and the BUD 33 of the CM#6 after the control unit of the saving destination is switched from the main control unit 34B of the CM#5 to the main control unit 34B of the CM#6 will be described with reference to FIG. 4C. In the example illustrated in FIG. 4C, dump data 100a that has been collected by the time when the usage rate of the main control unit 34B of the CM#5 exceeds the specific threshold is saved into the BUD 33 of the CM#5. Furthermore, dump data 100b that has been collected after the usage rate of the main control unit 34B of the CM#5 exceeds the specific threshold is saved into the BUD 33 of the CM#6. As described above, dump data not including the dump data that is collected by the time when the usage rate of the main control unit 34B of the CM#5 exceeds the specific threshold is saved into the BUD 33 of the CM#6.

Thus, as illustrated in FIG. 4D, in the storage system 2A, after the completion of siphoning processing for the dump data, the main control unit 34B of the CM#5 transfers the dump data saved in the BUD 33 of the CM#5 to the main control unit 34B of the CM#6. Since the front portion of the CA dump, which is saved in the BUD 33 of the CM#5, is compressed and is small in size, transfer is completed in a time shorter than the time for siphoning of CA dump data. In other words, the time for copying saved dump data is shorter than the time for saving CA dump. For example, the CA dump saving time is in the order of 100 ms/MB, while the copying processing for saved dump data is in the order of 1 ms/MB.

Figure 4E:
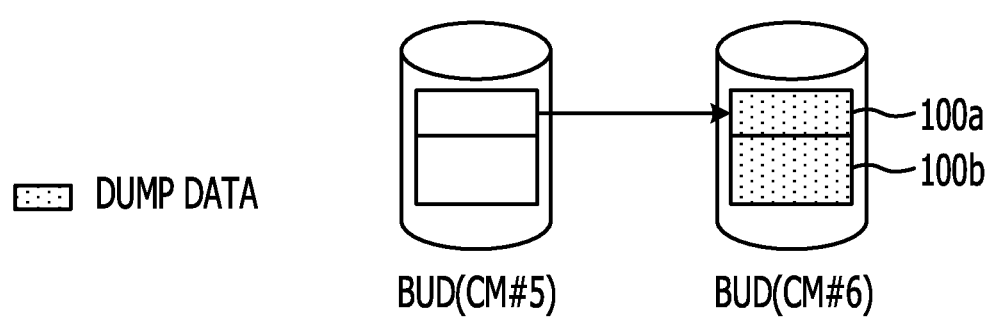
FIG. 4E illustrates an example of a processing operation of saving processing for dump data.

As a result, as illustrated in FIG. 4E, the dump data 100a copied from the BUD 33 of the CM#5 and the dump data 100b collected and saved after the usage rate of the main control unit 34B of the CM#5 exceeds the specific threshold are saved into the BUD 33 of the CM#6.

Copying Processing

Figure 5A:
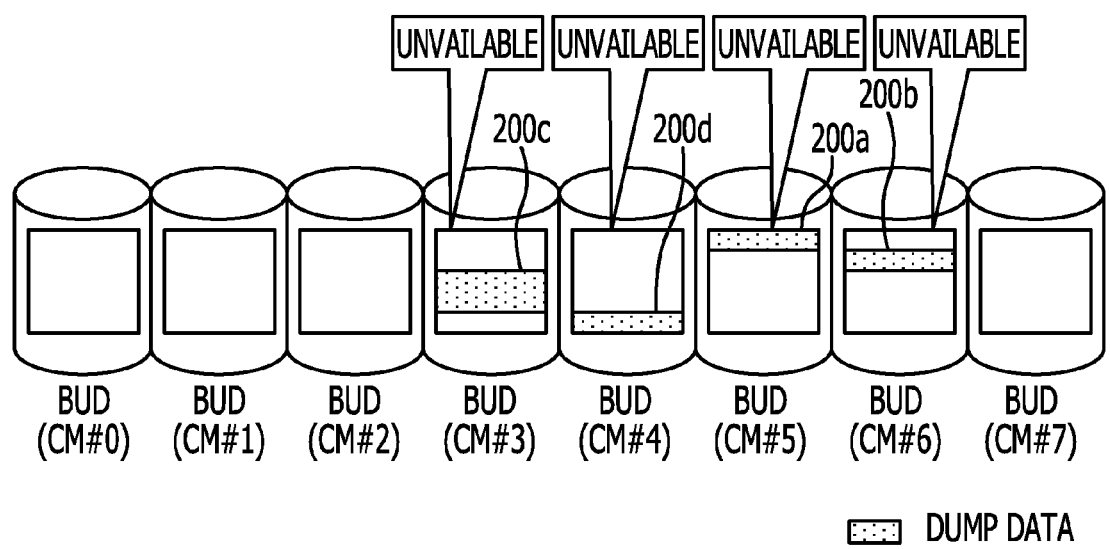
FIG. 5A illustrates an example in which fragments of compressed CA dump data are distributed in several BUDs.

The case where after completion of siphoning processing for dump data, copying of the dump data is performed has been described with reference to FIGS. 4D and 4E. In the case where switching of the control unit of a saving destination occurs a plurality of times in the storage system 2A, fragments of compressed CA dump data are distributed in several BUDs 33. FIG. 5A illustrates an example in which fragments of compressed CA dump data are distributed in several BUDs 33.

As illustrated in FIG. 5A, in the case where the control unit of a saving destination is switched to the CM#5, the CM#6, the CM#3, and the CM#4 in that order, fragments 200a to 200d of CA dump data are distributed in the BUDs 33 of the corresponding CMs. In this case, if a degradation of another CA occurs before the distributed fragments are combined together, available CA dump saving regions may be reduced, and CA dump may not be saved.

Figure 5B:
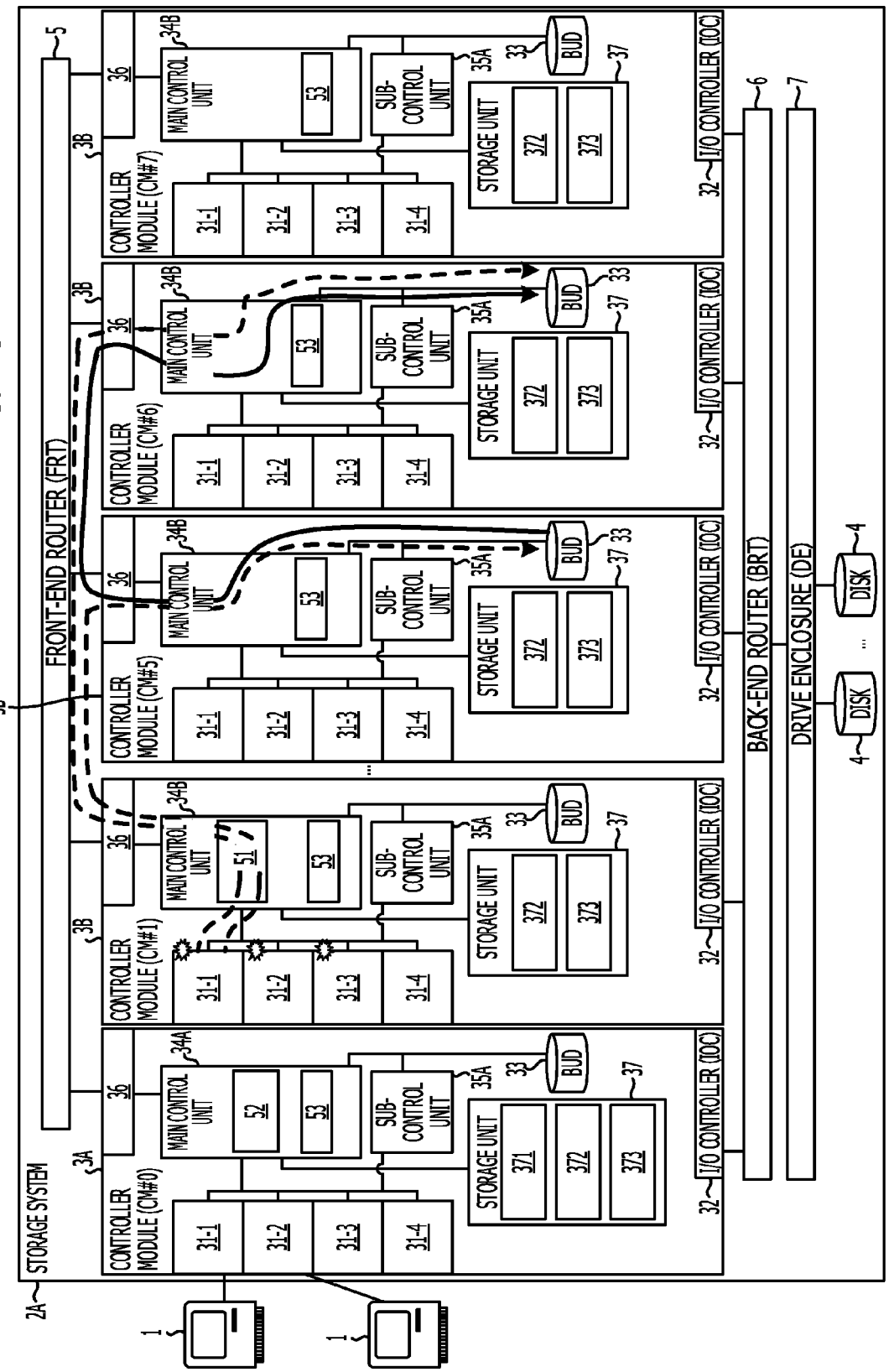
FIG. 5B illustrates an example in which siphoning processing for dump data and copying processing for dump data are performed in a parallel manner and an available CA dump saving region is widened in the middle of the siphoning processing.

Thus, the storage system 2A performs siphoning processing for dump data and copying processing for dump data in a parallel manner, and widens the available CA dump saving region in the middle of the siphoning processing. FIG. 5B illustrates an example in which siphoning processing for dump data and copying processing for dump data are performed in a parallel manner and the available CA dump saving region is widened in the middle of the siphoning processing.

In the example illustrated in FIG. 5B, after the control unit of a saving destination is switched from the main control unit 34B of the CM#5 to the main control unit 34B of the CM#6, the main control unit 34B of the CM#6 performs copying processing for dump data transferred from the CM#5 in parallel with saving processing for dump data.

Figure 5C:
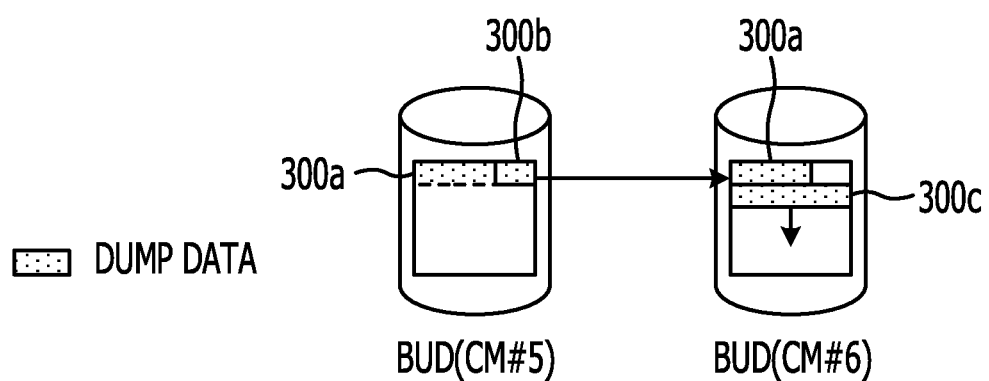
FIG. 5C illustrates an example in which after a control unit of a saving destination is switched from a main control unit of a CM#5 to a main control unit of a CM#6, dump data that has been saved in a BUD of the CM#5 in parallel with saving processing for dump data is combined with a BUD of the CM#6.

FIG. 5C illustrates an example in which after the control unit of a saving destination is switched from the main control unit 34B of the CM#5 to the main control unit 34B of the CM#6, dump data saved in the BUD 33 of the CM#5 is copied to the BUD 33 of the CM#6 in parallel with saving processing for dump data. FIG. 5C illustrates the case where the CM#6 saves dump data 300c into the BUD 33 in parallel with transfer of dump data 300a, which is part of dump data 300a and 300b saved in the BUD 33 of the CM#5, to the BUD 33 of the CM#6. Accordingly, even in the case where switching of the control unit of a saving destination occurs a plurality of times, the storage system 2A is capable of quickly addressing the condition in which CA dump is not saved.

Processing Procedure of Processing by Storage System

The processing procedure of processing by the storage system will now be described with reference to FIGS. 6A and 6B and FIGS. 7A and 7B. The processing procedure of siphoning processing for CA dump by the storage system will be described with reference to FIGS. 6A and 6B, and the processing procedure of siphoning destination designating processing will be described with reference to FIGS. 7A and 7B. In the description provided below, a main control unit provided in each CM is referred to as a CPU#0, and a sub-control unit provided in each CM is referred to as a CPU#1.

Siphoning Processing for CA Dump by Storage System

Figure 6A:
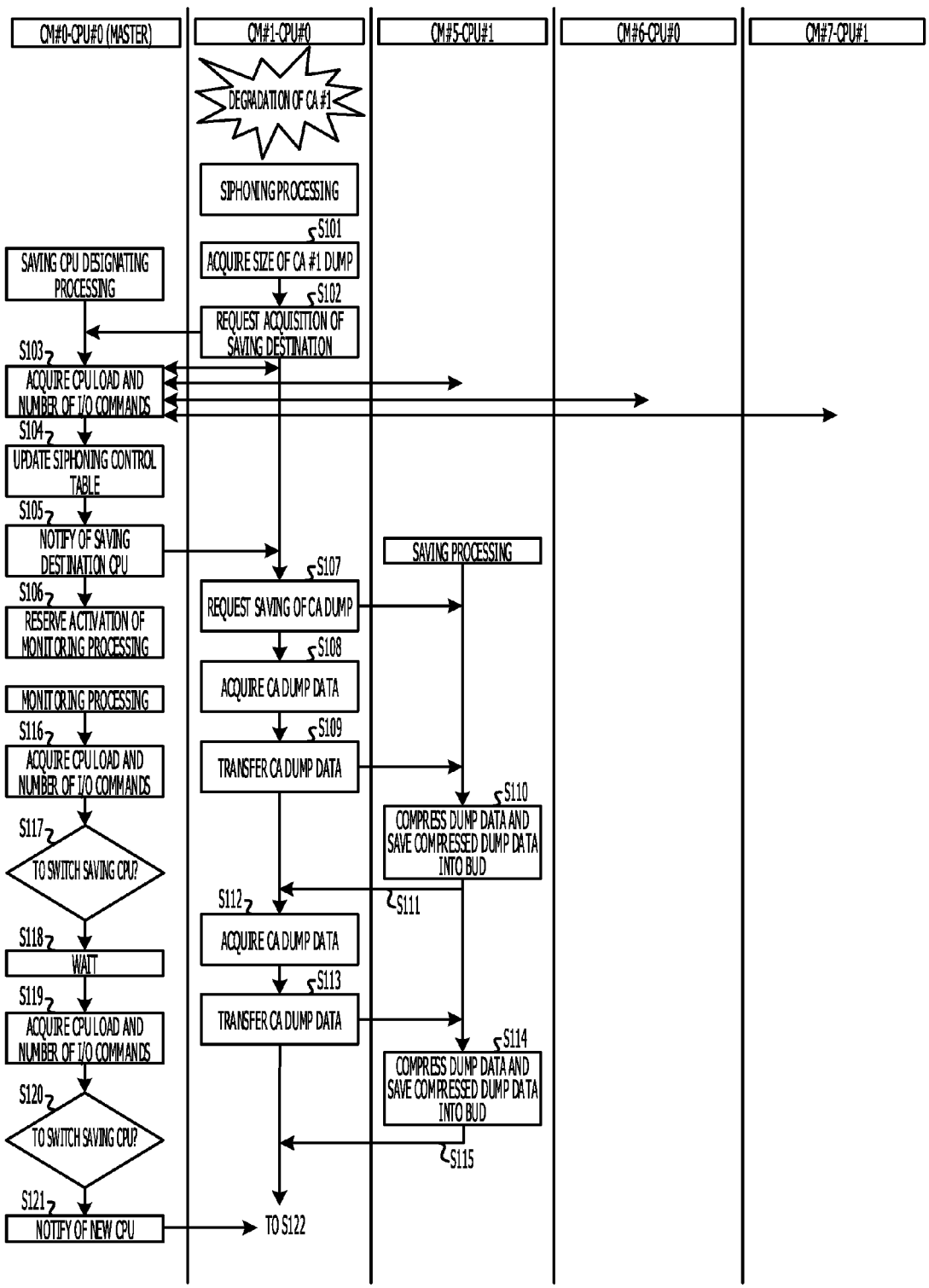
FIG. 6A is a sequence diagram illustrating siphoning processing for CA dump by a storage system.
Figure 6B:
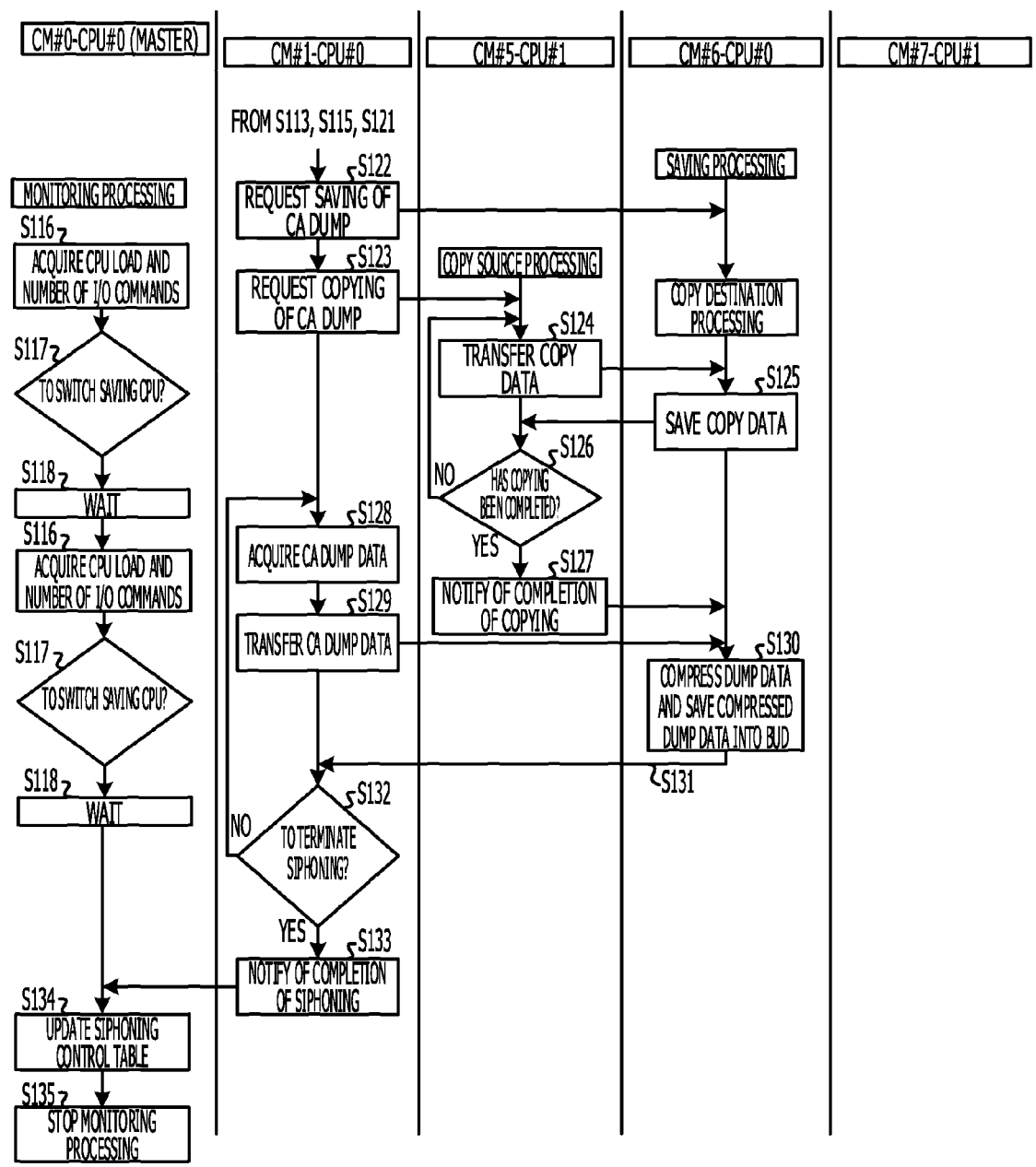
FIG. 6B is a sequence diagram illustrating siphoning processing for CA dump by a storage system.

FIGS. 6A and 6B are sequence diagrams illustrating siphoning processing for CA dump by the storage system 2A. The case where degradation of the CA#1 has occurred in the CM#1 and the CPU#0 of the CM#0 (referred to as CM#0-CPU#0), which is a master CM, selects the CPU#1 of the CM#5 (referred to as CM#5-CPU#1) as a saving destination is illustrated in FIGS. 6A and 6B. Furthermore, the case where the processing load of the CM#5-CPU#1 increases and the CM#0-CPU#0, which is the master CM, selects the CPU#0 of the CM#6 (referred to as CM#6-CPU#0) as a new saving destination is also illustrated in FIGS. 6A and 6B.

As illustrated in FIG. 6A, in the case where a degradation of the CA#1 has occurred in the CM#1, the CPU#0 of the CM#1 (referred to as CM#1-CPU#0) acquires the size of dump data of the CA#1 (S101), and requests the master CM for acquisition of a saving destination (S102).

The CM#0-CPU#0 acquires the CPU load and the number of I/O commands from each CPU in the storage system 2A (S103). Then, the CM#0-CPU#0 updates the siphoning control table (S104), selects a saving destination CPU, and notifies the CM#1-CPU#0 of the selected saving destination CPU (S105). Furthermore, the CM#0-CPU#0 reserves activation of monitoring processing (S106). Here, the description is provided on the assumption that the CM#0-CPU#0 selects the CM#5-CPU#1 as the saving destination CPU.

The CM#1-CPU#0 requests the CM#5-CPU#1 to save dump data of the CA#1 (S107). Then, the CM#1-CPU#0 acquires the dump data of the CA#1 (S108), and transfers the acquired dump data of CA#1 to the CM#5-CPU#1 (S109).

The CM#5-CPU#1 compresses the dump data of the CA#1 received from the CM#1-CPU#0, and saves the compressed dump data into the BUD 33 (S110). The CM#5-CPU#1 also notifies the CM#1-CPU#0 of completion of the saving (S111).

Here, the case where the CM#1-CPU#0 that is notified of the completion of the saving determines that all the dump data of the CA#1 has not yet been saved is illustrated in FIG. 6A. The CM#1-CPU#0 acquires the dump data of the CA#1 (S112), and transfers the acquired dump data of the CA#1 to the CM#5-CPU#1 (S113).

The CM#5-CPU#1 compresses the dump data of the CA#1 received from the CM#1-CPU#0, and saves the compressed dump data into the BUD 33 (S114). The CM#5-CPU#1 also notifies the CM#1-CPU#0 of completion of the saving (S115).

The CM#0-CPU#0 acquires the CPU load and the number of I/O commands from each CPU in the storage system 2A (S116). Then, the CM#0-CPU#0 determines whether to switch the saving destination CPU (S117). Here, the description is provided on the assumption that the CM#0-CPU#0 determines not to switch the saving destination CPU. In this case, the CM#0-CPU#0 waits for a specific period of time (S118), and acquires the CPU load and the number of I/O commands from each CPU in the storage system 2A (S119).

Then, the CM#0-CPU#0 determines whether to switch the saving destination CPU (S120). Here, the description is provided on the assumption that the CM#0-CPU#0 determines to switch the saving destination CPU. In this case, the CM#0-CPU#0 selects a new CPU, and notifies the CM#1-CPU#0 of the selected new CPU (S121). Here, the description is provided on the assumption that the CM#0-CPU#0 selects the CM#6-CPU#0 as the new CPU.

Then, as illustrated in FIG. 6B, the CM#1-CPU#0 requests the CM#6-CPU#0 to save dump data of the CA#1 (S122). Then, the CM#1-CPU#0 requests the CM#5-CPU#1 to copy the dump data of the CA#1 (S123). That is, the CM#1-CPU#0 causes the CM#5-CPU#1 to transfer the dump data of the CA#1 saved by the CM#5-CPU#1 to the CM#6-CPU#0 and causes the CM#6-CPU#0 to save the transferred dump data.

The CM#5-CPU#1 transfers copy data to the CM#6-CPU#0 (S124). Then, the CM#6-CPU#0 saves the received copy data into the BUD 33 (S125). The CM#5-CPU#1 determines whether or not copying has been completed (S126). In the case where the CM#5-CPU#1 determines that copying has been completed (YES in S126), the CM#5-CPU#1 notifies the CM#6-CPU#0 of completion of the copying (S127).

In the case where the CM#5-CPU#1 determines that copying has not yet been completed (NO in S126), the CM#5-CPU#1 proceeds to S124.

The CM#1-CPU#0 acquires dump data of the CA#1 (S128), and transfers the acquired dump data of the CA#1 to the CM#6-CPU#0 (S129).

The CM#6-CPU#0 compresses the dump data of the CA#1 received from the CM#1-CPU#0, and saves the compressed dump data into the BUD 33 (S130). The CM#6-CPU#0 also notifies the CM#1-CPU#0 of completion of the saving (S131).

The CM#1-CPU#0 that is notified of the completion of the saving determines whether to terminate the saving processing (S132). In other words, the CM#1-CPU#0 determines whether or not all the dump data of the CA#1 has been saved. In the case where the CM#1-CPU#0 determines to terminate saving processing (YES in S132), the CM#1-CPU#0 notifies the CM#0-CPU#0 of completion of the siphoning processing (S133). In the case where the CM#1-CPU#0 determines not to terminate the saving processing (NO in S132), the CM#1-CPU#0 proceeds to S128.

The CM#0-CPU#0 that is notified of the completion of the siphoning processing updates the siphoning control table (S134). Then, the CM#0-CPU#0 stops the monitoring processing (S135). After switching of the saving destination CPU is performed, the CM#0-CPU#0 repeatedly performs the monitoring processing (S116 to S118).

Siphoning Destination Designating Processing

Figure 7A:
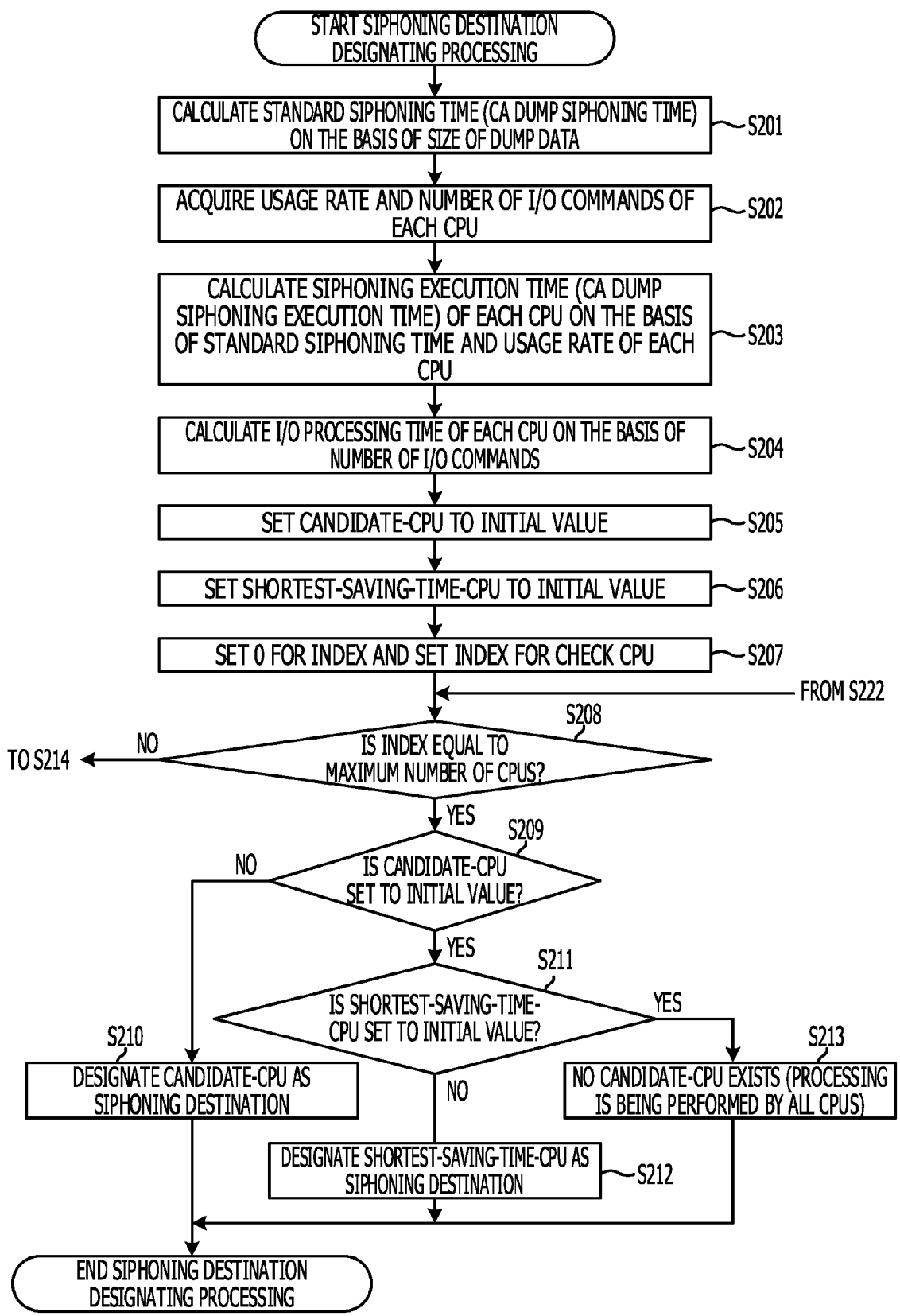
FIG. 7A is a flowchart illustrating a processing procedure for designating a siphoning destination in the second embodiment.
Figure 7B:
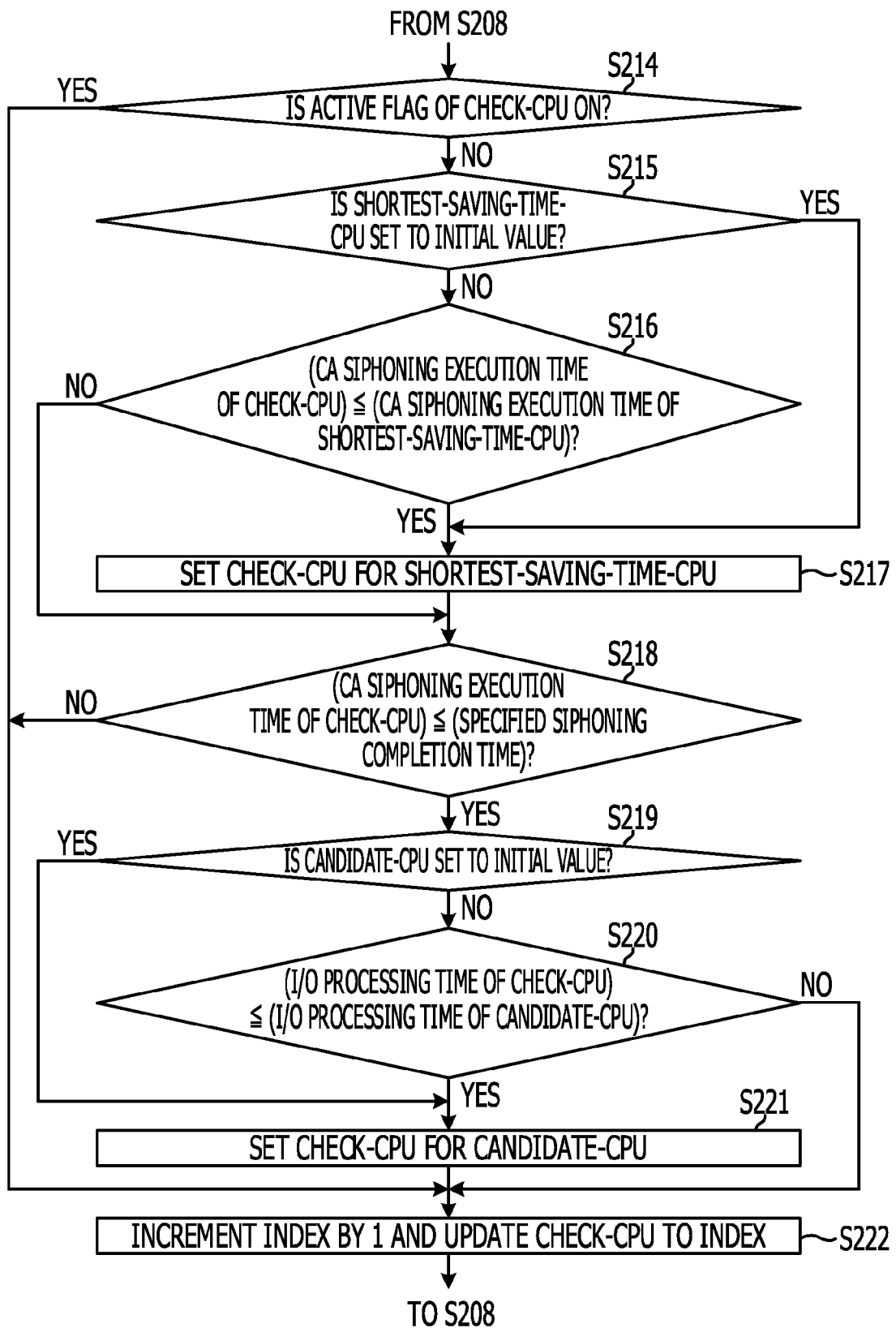
FIG. 7B is a flowchart illustrating the processing procedure of the processing for designating a siphoning destination in the second embodiment.

FIGS. 7A and 7B are flowcharts illustrating the processing procedure of siphoning destination designating processing in the second embodiment. Here, it is assumed that an index is assigned in advance for each CPU that may serve as a siphoning destination. For example, "0" is assigned for the main CPU of the CM#0, "1" is assigned for the sub-CPU of the CM#0, "2" is assigned for the main CPU of the CM#1, and "3" is assigned for the sub-CPU of the CM#1.

For example, upon receiving a command for acquiring a siphoning destination CPU including the size of dump data of a CA in which an error has occurred, the siphoning destination designating part 52 calculates a standard siphoning time (CA dump siphoning time) on the basis of the size of the dump data (S201). The CA dump siphoning time is calculated using Equation (1). Then, the siphoning destination designating part 52 stores the calculated CA dump siphoning time into the siphoning control table 371.

Then, the siphoning destination designating part 52 acquires the usage rate of CPU and the number of I/O commands from each CPU (S202). The usage rate of each CPU is stored in the CPU usage rate information 372 for each CM. The number of I/O commands for each CPU is stored in the command number information 373 for each CM.

Then, the siphoning destination designating part 52 calculates a standard siphoning execution time (CA dump siphoning execution time) of each CPU on the basis of the standard siphoning time and the usage rate of each CPU (S203). The CA dump siphoning execution time is calculated using Equation (2). Then, the siphoning destination designating part 52 stores the calculated CA dump siphoning execution time for each CPU into the siphoning control table 371.

Furthermore, the siphoning destination designating part 52 calculates the I/O processing time for each CPU on the basis of the number of I/O commands (S204). Then, the siphoning destination designating part 52 stores the calculated I/O processing time for each CPU into the siphoning control table 371.

Then, the siphoning destination designating part 52 sets CANDIDATE-CPU to an initial value (for example, 0xFF)

(S205). The CANDIDATE-CPU is a variable representing a CPU candidate for a siphoning destination CPU, and the value of the index assigned for the CANDIDATE-CPU is set. Furthermore, the siphoning destination designating part 52 sets SHORTEST-SAVING-TIME-CPU to an initial value (for example, 0xFF) (S206). The SHORTEST-SAVING-TIME-CPU is a variable representing a CPU whose dump data saving time is the shortest, and the value of the index assigned for the CPU whose saving time is the shortest is set.

Then, the siphoning destination designating part 52 sets INDEX to the value 0, which is the index of the CPU serving as a siphoning destination, and sets CHECK-CPU to the value set for the INDEX (S207). The INDEX is a variable, and the value of the index assigned for a CPU is set. The CHECK-CPU is variable representing a CPU that is checked whether to be a siphoning destination, and the value of the index assigned for the CPU is set.

Then, the siphoning destination designating part 52 determines whether or not the value set for the INDEX is equal to the maximum number of the CPUs that may serve as a siphoning destination (S208).

In the case where it is determined that the value set for the INDEX is not equal to the maximum number of the CPUs (NO in S208), the siphoning destination designating part 52 proceeds to S214.

The siphoning destination designating part 52 determines whether or not the active flag of the CHECK-CPU is ON, on the basis of the active flag stored in the siphoning control table 371 (S214). In the case where it is determined that the active flag of the CHECK-CPU is ON (YES in S214), the siphoning destination designating part 52 proceeds to S222 to check the next CPU.

In the case where it is determined that the active flag of the CHECK-CPU is not ON (NO in S214), the siphoning destination designating part 52 determines whether or not the SHORTEST-SAVING-TIME-CPU is set to the initial value (S215). In the case where it is determined that the SHORTEST-SAVING-TIME-CPU is set to the initial value (YES in S215), the siphoning destination designating part 52 proceeds to S217 to set the CHECK-CPU for the SHORTEST-SAVING-TIME-CPU.

In the case where it is determined that the SHORTEST-SAVING-TIME-CPU is not set to the initial value (NO in S215), the siphoning destination designating part 52 determines whether or not the CA siphoning execution time of the CHECK-CPU is shorter than or equal to the CA siphoning execution time of the SHORTEST-SAVING-TIME-CPU (S216). In the case where it is determined that the CA siphoning execution time of the CHECK-CPU is shorter than or equal to the CA siphoning execution time of the SHORTEST-SAVING-TIME-CPU (YES in S216), the siphoning destination designating part 52 proceeds to S217 to set the CHECK-CPU for the SHORTEST-SAVING-TIME-CPU.

The siphoning destination designating part 52 sets the CHECK-CPU for the SHORTEST-SAVING-TIME-CPU (S217). That is, the siphoning destination designating part 52 sets the CHECK-CPU currently being checked for as the CPU whose saving time is the shortest among the checked CPUs.

In the case where the CA siphoning execution time of the CHECK-CPU is longer than the CA siphoning execution time of the SHORTEST-SAVING-TIME-CPU (NO in S216), the siphoning destination designating part 52 determines whether or not the CA siphoning execution time of the CHECK-CPU is shorter than or equal to a specified siphoning completion time (S218). The specified siphoning completion time represents a specified time allowed for siphoning. In the case where it is determined that the CA siphoning execution time of the CHECK-CPU is longer than the specified siphoning completion time (NO in S218), the siphoning destination designating part 52 proceeds to S222 to check the next CPU.

In the case where it is determined that the CA siphoning execution time of the CHECK-CPU is shorter than or equal to the specified siphoning completion time (YES in S218), the siphoning destination designating part 52 determines whether or not the CANDIDATE-CPU is set to the initial value (S219). In the case where it is determined that the CANDIDATE-CPU is not set to the initial value (NO in S219), the siphoning destination designating part 52 determines whether or not the I/O processing time of the CHECK-CPU is shorter than or equal to the I/O processing time of the CANDIDATE-CPU (S220). In the case where it is determined that the I/O processing time of the CHECK-CPU is longer than the I/O processing time of the CANDIDATE-CPU (NO in S220), the siphoning destination designating part 52 proceeds to S222 to check the next CPU.

In the case where the CANDIDATE-CPU is set to the initial value (YES in S219) or the I/O processing time of the CHECK-CPU is shorter than or equal to the I/O processing time of the CANDIDATE-CPU (YES in S220), the siphoning destination designating part 52 proceeds to S221. The siphoning destination designating part 52 sets the CHECK-CPU for the CANDIDATE-CPU (S221). That is, the siphoning destination designating part 52 sets the CHECK-CPU currently being checked for as the CPU whose CA siphoning execution time is shorter than the specified siphoning completion time and whose I/O processing time is the shortest among the checked CPUs.

The siphoning destination designating part 52 increments the INDEX by 1, and updates the CHECK-CPU to the Index (S222). Then, the siphoning destination designating part 52 proceeds to S208.

In the case where it is determined in S408 that the value set for the INDEX is equal to the maximum number of CPUs that may serve as a siphoning destination (YES in S208), the siphoning destination designating part 52 determines whether or not the CANDIDATE-CPU is set to the initial value (S209). In the case where it is determined that the CANDIDATE-CPU is not set to the initial value (NO in S209), the siphoning destination designating part 52 designates the CANDIDATE-CPU as a siphoning destination (S210), and terminates the siphoning destination designating processing.

In the case where it is determined that the CANDIDATE-CPU is set to the initial value (YES in S209), the siphoning destination designating part 52 determines whether or not the SHORTEST-SAVING-TIME-CPU is set to the initial value (S211). If there is no CPU whose CA siphoning execution time is shorter than the specified siphoning completion time, the SHORTEST-SAVING-TIME-CPU is still set to the initial value. In the case where it is determined that the SHORTEST-SAVING-TIME-CPU is not set to the initial value (NO in S211), the siphoning destination designating part 52 designates the SHORTEST-SAVING-TIME-CPU as a siphoning destination (S212), and terminates the siphoning destination designating processing.

In the case where it is determined that the SHORTEST-SAVING-TIME-CPU is set to the initial value (YES in S211), the siphoning destination designating part 52 determines that there is no candidate CPU for a siphoning destination (S213), and terminates the siphoning destination designating processing.

Effects of Second Embodiment

As described above, the storage system 2A according to the second embodiment selects a CPU that is processing the smallest number of I/O commands, on the basis of the number of I/O commands being processed by each CPU, to perform siphoning processing for CA dump. That is, the storage system 2A according to the second embodiment separates a collecting CM and a saving CM from each other. Accordingly, the storage system 2A according to the second embodiment is capable of reducing the influence of processing for siphoning dump data of a CA on the performance of the storage system 2A, and the possibility of completing the siphoning of CA dump is increased.

In the storage system 2A according to the second embodiment, in the case where the usage rate of a control unit that is performing siphoning processing goes beyond a specific threshold range during execution of processing for saving collected dump data, another control unit is requested to perform saving processing for dump data. Thus, even in the case where the usage rate of a control unit that is performing siphoning processing goes beyond the specific threshold range during execution of saving processing, the storage system 2A is capable of recording dump data collected from the CA 31 with certainty.

After siphoning processing is completed, the storage system 2A combines fragments of compressed dump data saved in the BUDs 33 of corresponding CMs together. This combining processing is not monitored for time constraints and may be executed without time constraints. Here, the storage system 2A may select a BUD having a region in which the largest amount of compressed dump data is stored as a CA dump combining destination BUD 33 for the combining processing.

When switching of the saving destination CPU is performed a plurality of times, fragments of compressed CA dump data are distributed in several BUDs 33. If a degradation of another CA occurs before combining the fragments together, available CA dump saving regions may be reduced. Thus, CA dump saving may not be performed. Thus, in the case where switching of a CPU of a saving destination CM occurs, the storage system 2A performs CA dump siphoning processing for a CPU of a new saving destination CM and combining processing for CA dump data in a parallel manner. Although the processing of the master CM 3A becomes complicated, since the front portion of CA dump saved in the BUD 33 before switching is performed is compressed and is small in size, combining processing for CA dump data may be completed in a time shorter than the time for saving for CA dump data. Accordingly, the storage system 2A is capable of widening the available CA dump saving region in the middle of the siphoning processing. As a result, even in the case where switching of a CPU occurs a plurality of times, the storage system 2A is capable of quickly addressing the condition in which saving of CA dump is not performed.

The storage system 2A may perform switching of a control unit of a saving destination in the case where all the three conditions provided below are satisfied. For example, the load of a control unit of a saving destination becomes large, and siphoning of CA dump is not performed within a specified time. Another control unit that has a lower load and that is capable of siphoning all the remaining CA dump exists. The number of switching times does not reach the maximum number of switching times. Here, the "maximum number of switching times" is set to, for example, three. In this case, up to half of the eight BUDs, that is, up to four regions of the storage system 2A may be used. In the case where the above-mentioned three conditions are satisfied, the storage system 2A is capable of siphoning all the CA dump. The "maximum number of switching times" may be changed.

In the storage system 2A according to the second embodiment, the siphoning destination designating part 52 may be provided in the CM 3B. In this case, the storage unit 37B of the CM 3B stores the siphoning control table 371.

Other Embodiments

Various other embodiments may be implemented. Other embodiments will be described.

System Configuration

All or part of the processing that has been described as being automatically performed in the foregoing embodiments may be performed manually. Alternatively, all or part of the processing that has been described as being manually performed may be performed automatically in a known method. Furthermore, the processing procedures, control procedures, and specific names illustrated in the description and drawings may be changed unless otherwise specified.

Furthermore, in the storage system 2 according to the first embodiment, in the case where an error has occurred in a CA 31, the main control unit 34 may select a saving destination for dump data collected from the CA 31 on the basis of the usage rates and the number of I/O commands of control units in the storage system 2.

Furthermore, the order of the processing procedure of the individual processing operations described in the foregoing embodiments may be changed in accordance with various loads and use conditions. Furthermore, component parts in the drawings are illustrated in terms of functional concepts and may not be physically configured as illustrated. Furthermore, all or part of the processing functions in the individual devices may be implemented by a CPU analyzing and executing a program or may be implemented as hardware by wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system comprising:
a plurality of control devices to control output and input of data to and from a storage device, at least one of the plurality of control devices including:
an interface unit to receive an instruction regarding output or input of data to or from the storage device, and
an arithmetic processing unit to
receive the instruction from the interface unit and execute the instruction,
select, when an error has occurred in a specific interface unit, a first processing unit and request the first processing unit to execute saving processing for saving dump data of the specific interface unit, the specific interface unit being included in one of the plurality of control devices, the first processing unit being included in one of the plurality of control devices, and
select, when a usage rate of the first processing unit goes beyond a threshold range during execution of the saving processing, a second processing unit and request the second processing unit to execute the saving processing, the second processing unit being included in one of the plurality of control devices.

2. The storage system according to claim 1, wherein the arithmetic processing unit selects, when the specific interface unit is included in a control device including the arithmetic processing unit, the arithmetic processing unit itself and executes the saving processing, and selects, when a usage rate of the arithmetic processing unit goes beyond the threshold range during execution of the saving processing, the second processing unit and requests the second processing unit to execute the saving processing.

3. The storage system according to claim 1, wherein the arithmetic processing unit causes, when the usage rate of the first processing unit goes beyond the threshold range during execution of the saving processing, first data to be copied to the second processing unit, the first data being dump data that has been saved by the first processing unit and that has not been saved by the second processing unit.

4. The storage system according to claim 3, wherein the saving processing by the second processing unit and the copying are performed in a parallel manner.

5. The storage system according to claim 1, wherein the arithmetic processing unit monitors a usage rate of a processing unit included in each of the plurality of control devices, and selects, as the first processing unit, a processing unit whose I/O processing time calculated based on a number of I/O instructions is shortest among processing units whose dump data saving processing times calculated based on respective usage rates are shorter than a specific time.

6. A method for controlling a storage system including a plurality of control devices, the plurality of control devices each including an interface unit and an arithmetic processing unit, the method comprising:

receiving, by a first interface unit, an instruction regarding output or input of data to or from a storage device, the first interface unit being included in a first control device out of the plurality of control devices;

receiving, by a first arithmetic processing unit, the instruction from the first interface unit and executing the instruction, the first arithmetic processing unit being included in the first control device;

selecting by the first arithmetic processing unit, when an error has occurred in a specific interface unit, a first processing unit and requesting the first processing unit to execute saving processing for saving dump data of the specific interface unit, the specific interface unit being included in one of the plurality of control devices, the first processing unit being included in one of the plurality of control devices, and selecting by the first arithmetic processing unit, when a usage rate of the first processing unit goes beyond a threshold range during execution of the saving processing, a second processing unit and requesting the second processing unit to execute the saving processing, the second processing unit being included in one of the plurality of control devices.

7. The method according to claim 6, further comprising:

selecting by the first arithmetic processing unit, when the specific interface unit is included in a control device including the first arithmetic processing unit, the first arithmetic processing unit itself and executing the saving processing, and selecting by the first arithmetic processing unit, when a usage rate of the first arithmetic processing unit goes beyond the threshold range during execution of the saving processing, the second processing unit and requesting the second processing unit to execute the saving processing.

8. The method according to claim 6, further comprising:

causing by the first arithmetic processing unit, when the usage rate of the first processing unit goes beyond the threshold range during execution of the saving processing, first data to be copied to the second processing unit, the first data being dump data that has been saved by the first processing unit and that has not been saved by the second processing unit.

9. The method according to claim 8, wherein the saving processing by the second processing unit and the copying are performed in a parallel manner.

10. The method according to claim 6, further comprising:

monitoring, by the first arithmetic processing unit, a usage rate of a processing unit included in each of the plurality of control devices, and selecting by the first arithmetic processing unit, as the first processing unit, a processing unit whose I/O processing time calculated based on a number of I/O instructions is shortest among processing units whose dump data saving processing times calculated based on respective usage rates are shorter than a specific time.

\* \* \* \* \*